(12) United States Patent
Schwarz et al.

(10) Patent No.: US 9,970,323 B2
(45) Date of Patent: May 15, 2018

(54) GEARED TURBOFAN ENGINE WITH OPTIMIZED DIFFUSER CASE FLANGE LOCATION

(71) Applicant: United Technologies Corporation, Hartford, CT (US)

(72) Inventors: Frederick M. Schwarz, Glastonbury, CT (US); Gabriel L. Suciu, Glastonbury, CT (US)

(73) Assignee: United Technologies Corporation, Farmington, CT (US)

( * ) Notice: Subject to any disclaimer, the term of this patent is extended or adjusted under 35 U.S.C. 154(b) by 477 days.

(21) Appl. No.: 14/427,664

(22) PCT Filed: Mar. 14, 2013

(86) PCT No.: PCT/US2013/031301
§ 371 (c)(1),
(2) Date: Mar. 12, 2015

(87) PCT Pub. No.: WO2014/058466
PCT Pub. Date: Apr. 17, 2014

(65) Prior Publication Data
US 2015/0247424 A1 Sep. 3, 2015

Related U.S. Application Data

(60) Provisional application No. 61/711,252, filed on Oct. 9, 2012.

(51) Int. Cl.
*F02C 3/04* (2006.01)
*F01D 25/24* (2006.01)
(Continued)

(52) U.S. Cl.
CPC ........... *F01D 25/24* (2013.01); *F01D 25/243* (2013.01); *F02C 3/10* (2013.01); *F02C 6/08* (2013.01);
(Continued)

(58) Field of Classification Search
USPC ......... 60/796, 751, 756, 758, 802, 804, 805, 60/330, 340; 415/55.1, 207, 208.1, 208.2,
(Continued)

(56) References Cited

U.S. PATENT DOCUMENTS 3,978,664 A 9/1976 Parker et al.
4,236,869 A 12/1980 Laurello
(Continued)

FOREIGN PATENT DOCUMENTS

EP 2243928 A2 10/2010

OTHER PUBLICATIONS

Supplementary European Search Report for European Application No. 13845653.8 dated Jun. 14, 2016.
(Continued)

*Primary Examiner* — Binh Q Tran
(74) *Attorney, Agent, or Firm* — Carlson, Gaskey & Olds, P.C.

(57) ABSTRACT

A gas turbine engine has a compressor section, a compressor case substantially surrounding the compressor section, and a diffuser case attached at an attachment interface to the compressor case. The attachment interface is between a forward and an aft end of the compressor. A geared turbofan is also disclosed.

21 Claims, 3 Drawing Sheets

(51) Int. Cl.
*F02C 6/08* (2006.01)
*F02C 3/10* (2006.01)
*F02C 7/36* (2006.01)

(52) U.S. Cl.
CPC ............ *F02C 7/36* (2013.01); *F05D 2250/30* (2013.01); *F05D 2260/40311* (2013.01)

(58) Field of Classification Search
USPC .................. 415/209.2, 213.1, 219.1, 220
See application file for complete search history.

(56) References Cited

U.S. PATENT DOCUMENTS

| | | | |
|---|---|---|---|
| 4,503,668 A | 3/1985 | Duncan, III et al. | |
| 4,714,404 A | 12/1987 | Lardellier | |
| 4,827,712 A | 5/1989 | Coplin | |
| 5,059,091 A | 10/1991 | Hatfield | |
| 5,632,141 A | 5/1997 | Sloop et al. | |
| 5,704,211 A | 1/1998 | Hatfield | |
| 5,791,138 A * | 8/1998 | Lillibridge | F02C 7/045 60/262 |
| 6,385,959 B1 * | 5/2002 | Montoya | F02C 3/13 60/39.15 |
| 7,409,831 B2 | 8/2008 | Lepretre | |
| 7,827,799 B2 | 11/2010 | O'Neill et al. | |
| 7,921,636 B2 | 4/2011 | Suciu et al. | |
| 8,365,510 B2 * | 2/2013 | Lugg | F01D 15/10 310/11 |
| 9,016,068 B2 * | 4/2015 | Martin | F02C 7/20 244/58 |
| 9,458,855 B2 * | 10/2016 | Dierksmeier | F01D 11/24 |
| 2009/0180864 A1 | 7/2009 | Alvanos et al. | |
| 2011/0314828 A1 | 12/2011 | Bil et al. | |
| 2012/0060507 A1 | 3/2012 | King et al. | |
| 2012/0117982 A1 * | 5/2012 | Suciu | F02C 7/32 60/802 |
| 2012/0167588 A1 | 7/2012 | Dierksmeier et al. | |
| 2013/0230386 A1 * | 9/2013 | Baumann | F01D 11/00 415/170.1 |

OTHER PUBLICATIONS

International Preliminary Report on Patentability for International Application No. PCT/US2013/031301 dated Apr. 23, 2015.
International Search Report and Written Opinion for International Application No. PCT/US2013/031301 completed Jul. 8, 2013.

* cited by examiner

GEARED TURBOFAN ENGINE WITH OPTIMIZED DIFFUSER CASE FLANGE LOCATION

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

The high pressure turbine drives the high pressure compressor through an outer shaft to form a high spool, and the low pressure turbine drives the low pressure compressor through an inner shaft to form a low spool. The fan section may also be driven by the low inner shaft. A speed reduction device such as an epicyclical gear assembly may be utilized to drive the fan section such that the fan section may rotate at a speed different than the turbine section so as to increase the overall propulsive efficiency of the engine. In such engine architectures, a shaft driven by one of the turbine sections provides an input to the epicyclical gear assembly that drives the fan section at a reduced speed such that both the turbine section and the fan section can rotate at closer to optimal speeds.

Although geared architectures have improved propulsive efficiency, turbine engine manufacturers continue to seek further improvements to engine performance including improvements to thermal, transfer and propulsive efficiencies.

SUMMARY

In a featured embodiment, a gas turbine engine has a compressor section, a compressor case substantially surrounding the compressor section, and a diffuser case attached at an attachment interface to the compressor case. The attachment interface is between a forward and an aft end of the compressor.

In another embodiment according to the previous embodiment, the compressor section includes a first compressor operating at a first pressure and a second compressor operating at a second pressure that is higher than the first pressure. The first compressor defines the forward end and the second compressor defines the aft end of the compressor section.

In another embodiment according to any of the previous embodiments, the second compressor has a plurality of stages. The diffuser case is configured to surround at least one stage of the second compressor.

In another embodiment according to any of the previous embodiments, the second compressor has a plurality of stages. The diffuser case is configured to surround at least two stages of the second compressor.

In another embodiment according to any of the previous embodiments, the diffuser case includes at least one bleed positioned aft of the attachment interface.

In another embodiment according to any of the previous embodiments, the at least one bleed has an air supply boss configured to supply bleed air for cabin pressurization under a predetermined condition.

In another embodiment according to any of the previous embodiments, the predetermined condition has a high altitude and low engine power condition.

In another embodiment according to any of the previous embodiments, the attachment interface defines a parting line between the compressor case and the diffuser case. The compressor section has a plurality of disks that includes an aftmost disk that is defined by a disk center plane. The parting line is at or behind the center plane of the aftmost disk.

In another embodiment according to any of the previous embodiments, the attachment interface defines a parting line between the compressor case and the diffuser case. The compressor section has a plurality of disks that includes a second-to-aftmost disk that is defined by a disk center plane. The parting line is at or behind the center plane of the second-to-aftmost disk.

In another embodiment according to any of the previous embodiments, the attachment interface defines a parting line between the compressor case and the diffuser case. The compressor section has a plurality of disks that includes a third-to-aftmost disk that is defined by a disk center plane. The parting line is at or behind the center plane of the third-to-aftmost disk.

In another embodiment according to any of the previous embodiments, the attachment interface has an external flange connection, and includes a support structure for an outer flowpath static structure that has an internal flange connection to the diffuser case that is positioned axially aft of the external flange connection.

In another featured embodiment, a geared turbofan engine has a fan including a plurality of fan blades rotatable about an axis. A core engine includes a compressor section, a combustor in fluid communication with the compressor section, and a turbine section in fluid communication with the combustor. A compressor case supports the compressor section. A diffuser case is attached at an attachment interface to the compressor case. The attachment interface is between a forward and an aft end of the compressor section. The diffuser case includes at least one environmental control system off-take. A geared architecture is driven by the turbine section for rotating the fan about the axis.

In another embodiment according to the previous embodiment, the compressor section includes a first compressor operating at a first pressure and a second compressor operating at a second pressure that is higher than the first pressure. The first compressor defines the forward end and the second compressor defines the aft end of the compressor section.

In another embodiment according to any of the previous embodiments, the second compressor has a plurality of stages. The diffuser case is configured to surround at least one stage of the second compressor.

In another embodiment according to any of the previous embodiments, the at least one environmental control system off-take has at least one bleed positioned aft of the attachment interface.

In another embodiment according to any of the previous embodiments, the at least one bleed comprises an air supply boss configured to supply bleed air for cabin pressurization under a predetermined condition.

In another embodiment according to any of the previous embodiments, the predetermined condition has a high altitude and low engine power condition.

In another embodiment according to any of the previous embodiments, the attachment interface defines a parting line between the compressor case and the diffuser case. The compressor section has a plurality of disks that includes an aftmost disk that is defined by a disk center plane. The parting line is at or behind the center plane of the aft-most disk.

In another embodiment according to any of the previous embodiments, the attachment interface defines a parting line between the compressor case and the diffuser case. The compressor section has a plurality of disks that includes a second-to-aftmost disk that is defined by a disk center plane. The parting line is at or behind the center plane of the second-to-aftmost disk.

In another embodiment according to any of the previous embodiments, the attachment interface defines a parting line between the compressor case and the diffuser case. The compressor section has a plurality of disks that includes a third-to-aftmost disk that is defined by a disk center plane. The parting line is at or behind the center plane of the third-to-aftmost disk.

In another embodiment according to any of the previous embodiments, the attachment interface has an external flange connection, and includes a support structure for an outer flowpath static structure that has an internal flange connection to the diffuser case that is positioned axially aft of the external flange connection.

BRIEF DESCRIPTION OF THE DRAWINGS

The disclosure can be further understood by reference to the following detailed description when considered in connection with the accompanying drawings wherein.

DETAILED DESCRIPTION

Figure 1:
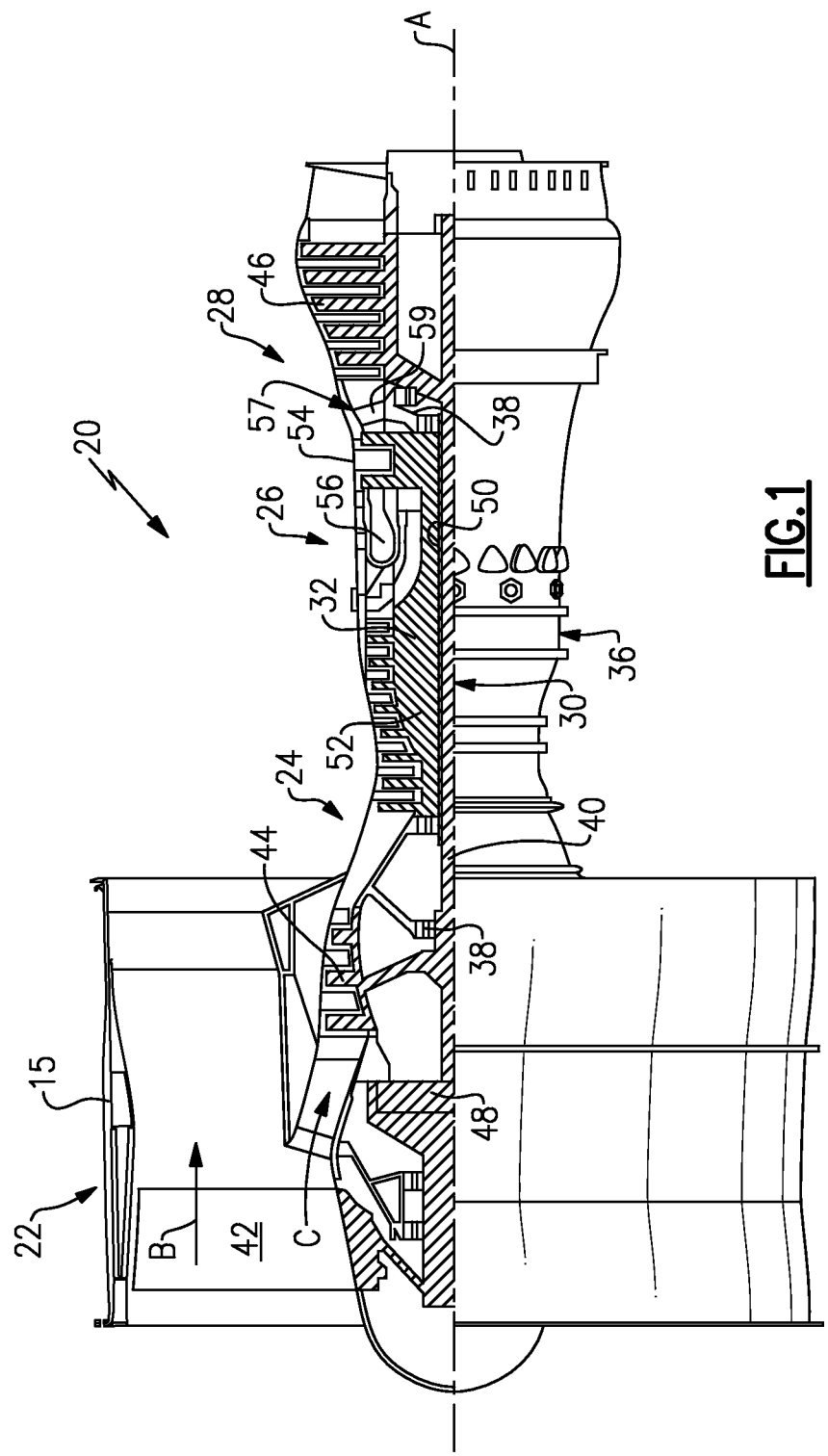
FIG. 1 schematically illustrates a geared turbofan engine embodiment.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 50 may be varied. For example, gear system 50 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of 1 bm of fuel being burned divided by 1 bf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second.

The example gas turbine engine includes the fan 42 that comprises in one non-limiting embodiment less than about 26 fan blades. In another non-limiting embodiment, the fan section 22 includes less than about 20 fan blades. Moreover, in one disclosed embodiment the low pressure turbine 46 includes no more than about 6 turbine rotors schematically indicated at 34. In another non-limiting example embodiment the low pressure turbine 46 includes about 3 turbine rotors. A ratio between the number of fan blades 42 and the number of low pressure turbine rotors is between about 3.3 and about 8.6. The example low pressure turbine 46 provides the driving power to rotate the fan section 22 and therefore the relationship between the number of turbine rotors 34 in the low pressure turbine 46 and the number of blades 42 in the fan section 22 disclose an example gas turbine engine 20 with increased power transfer efficiency.

Figure 2:
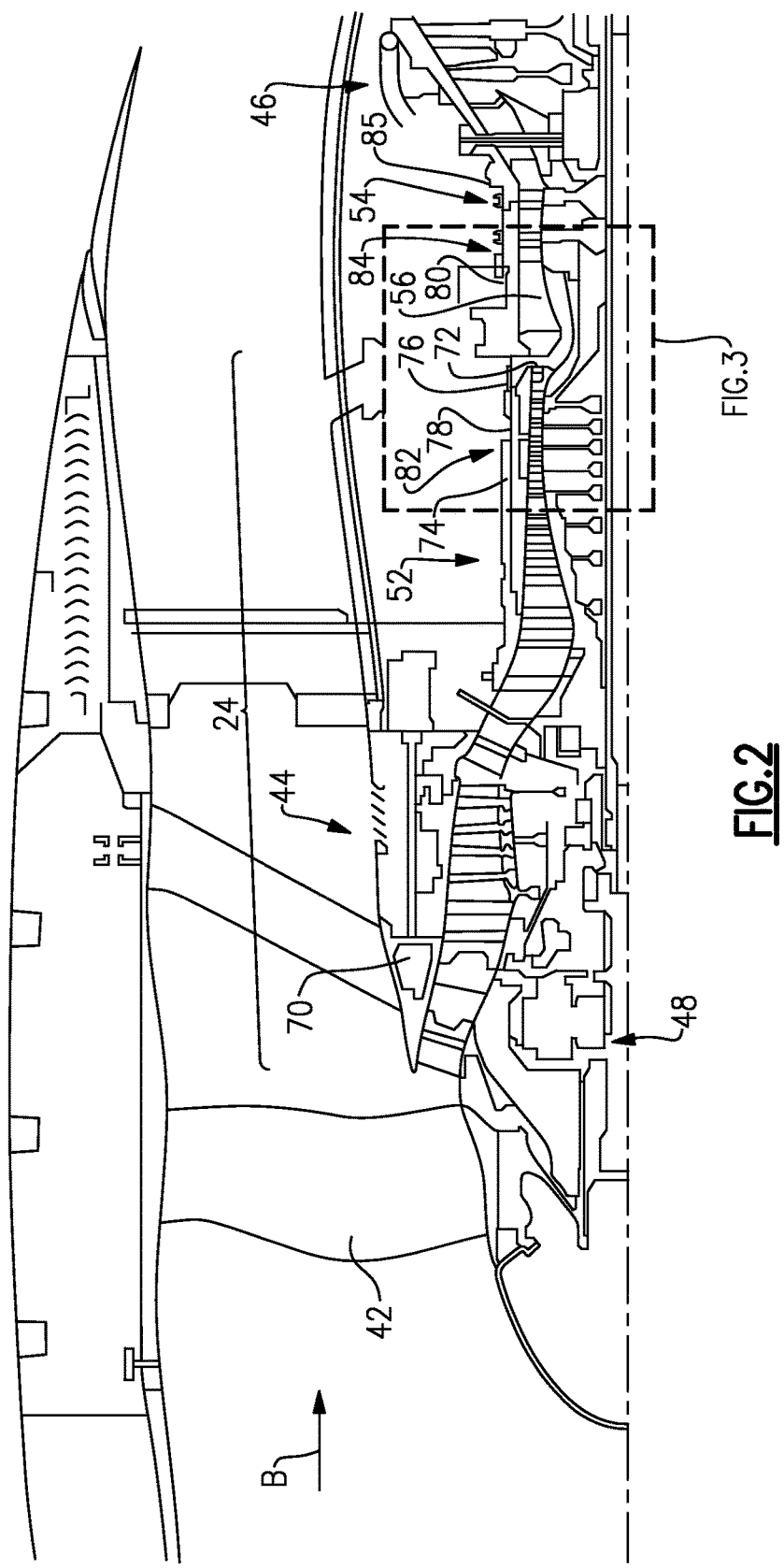
FIG. 2 illustrates a partial section view of a geared turbofan engine showing a connection interface between a compressor case and diffuser case.

As shown in FIG. 2, the compressor section 24 extends from a forward compressor end 70 to an aft compressor end 72. A compressor case 74 supports the compressor section 24 and surrounds the low 44 and high 52 pressure compressors. A diffuser case 76 extends from a first end 78 to a second end 80. The first end 78 is attached to the aft compressor end 72 at an attachment interface 82. The second end 80 of the diffuser case 76 is attached to a turbine case 85 at attachment interface 84. The attachment interface 82 is positioned forward of the aft compressor end 72.

Figure 3:
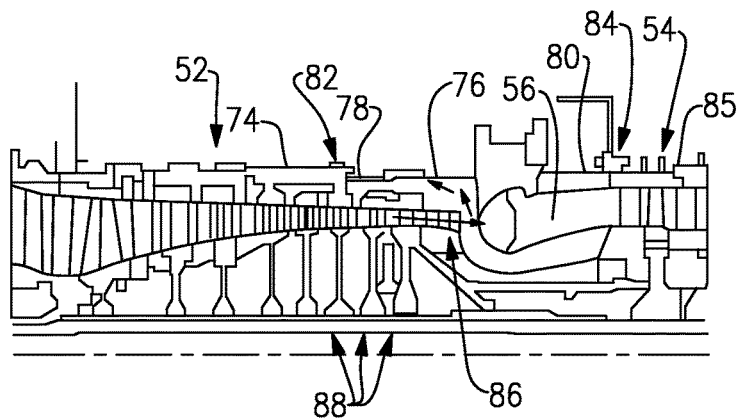
FIG. 3 is a magnified view of the connection interface between the compressor case and diffuser case of FIG. 2.

As shown, a high pressure compressor flow path, indicated by arrows 86 in FIG. 3, extends axially aft of the attachment interface 82 between the compressor case 74 that surrounds the high pressure compressor 52 and the diffuser case 76. The high pressure compressor 52 includes a plurality of stages 88 that are comprised of rotating blades as known. One or more of these stages 88 is positioned aft of the compressor case 74. In other words, at least one of the stages 88 is surrounded by the diffuser case 76. In one example, at least two stages 88 are surrounded by the diffuser case 76.

Figure 4:
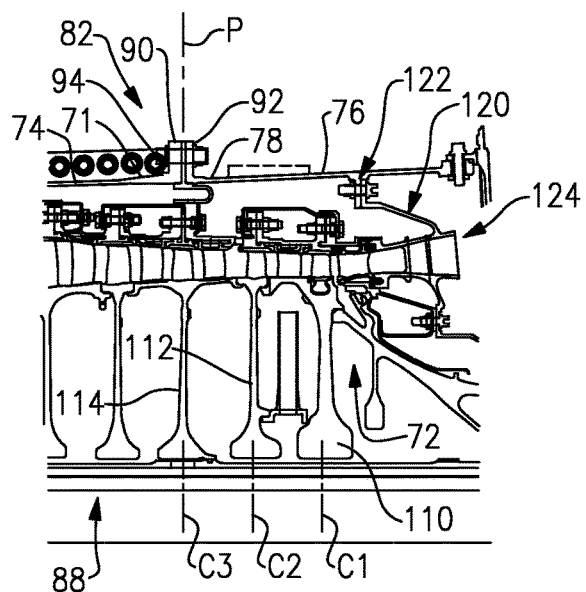
FIG. 4 is a magnified view of the connection interface of FIG. 3.

As shown in FIG. 4, the compressor case 74 includes a compressor mount flange 90 at an aft compressor case end 71, and the diffuser case 76 includes a diffuser mount flange 92. The flanges 90, 92 are in direct abutting engagement with each other at a parting line P and are secured together by at least one fastener 94. The flanges 90, 92 are positioned axially forward of the compressor aft end 72.

The compressor section 24 includes an axial aft, that is, last disk 110 in the last section that is defined by a disk center plane C1. An axially sequential, second-to-last disk 112 is defined by a disk center plane C2, and another axially sequential, third-to-last disk 114 is defined by a disk center plane C3. In one example, the parting line P is at or axially forward of the center plane C1 of the last disk 110. In another example, the parting line P is at or axially forward of the center plane C2 of the second-to-last disk 112. In another example, the parting line P is at or axially forward of the center plane C3 of the third-to-last disk 114.

Also shown in FIG. 4 is a support structure 120 with an internal flange connection interface 122 to the diffuser case 76 that is positioned axially aft of the external connection interface at 82. The support structure 120 provides support for a radially outer flowpath static structure 124. This configuration allows the radially internal flange connection interface 122, which is immersed in hot compressor air to be thinner and lighter than if the internal flange connection interface were positioned axially closer to external connection interface 82. This is because the radially external connection interface at 82 is fairly cold as this compressor structure is subjected to coolish air around its entire outer surface. If the external connection interface 82 were axially closer to the internal flange connection interface 122, the two connection interfaces would thermally fight with each other, which would require the both interfaces to be heavier to reduce stresses in both structures.

Figure 5:
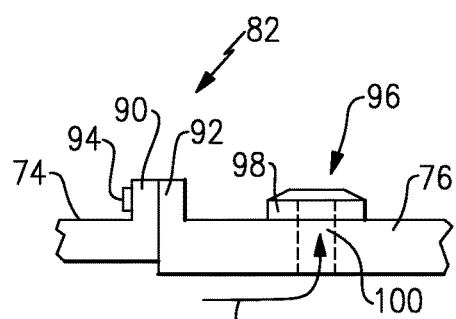
FIG. 5 is a schematic illustration of a diffuser case bleed location.

As shown in FIG. 5, one or more bleeds 96 are formed within the diffuser case 76. In one example, the bleeds 96 comprise bosses 98 that define an internal air passage 100 that is in fluid communication with the high pressure compressor flow path 86. The bosses 98 are formed in an outer surface of the diffuser case 76 and are positioned adjacent the first end 78 of the diffuser case 76.

The mating connection between the compressor case 74 for the high pressure compressor 52 and the diffuser case 76 is extended well forward of typical gas turbine engine arrangements. The extended diffuser case 76 enables placement of the air supply bosses 98 on a forward section of the diffuser case 76. Additionally, plumbing flanges for environmental control system off-takes from the engine can also be located in the forward section of the diffuser case 76.

The example disclosed arrangement enables the location of accessory components and environmental control system (ECS) off-takes in the limited space provided in the geared turbofan small core and engine cowling while maintaining sufficient space for the large heat exchanger components. The ECS system provides for cabin pressurization by tapping high pressure compressor exit air and mid-compressor air. The forward section of the diffuser enables take off of bleed air from the high pressure compressor when the aircraft is at high altitude and/or at low engine power that may occur at the top or beginning of a descent of the aircraft.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A gas turbine engine comprising:
   a compressor section;
   a compressor case substantially surrounding the compressor section;
   a diffuser case having a first end and a second end, the diffuser case being attached at an attachment interface at the first end to the compressor case, the attachment interface being between a forward and an aft end of the compressor section, and wherein the attachment interface comprises an external flange connection;
   a support structure for an outer flowpath static structure that has an internal flange connection to the diffuser case that is positioned axially aft of the external flange connection; and
   at least one bleed formed in the diffuser case, wherein the bleed is positioned aft of the external flange connection and forward of the internal flange connection.

2. The gas turbine engine according to claim 1 wherein the compressor section includes a first compressor operating at a first pressure and a second compressor operating at a second pressure that is higher than the first pressure, and wherein the first compressor defines the forward end and the second compressor defines the aft end of the compressor section.

3. The gas turbine engine according to claim 2 wherein the second compressor comprises a plurality of stages, and wherein the diffuser case is configured to surround at least one stage of the second compressor.

4. The gas turbine engine according to claim 2 wherein the second compressor comprises a plurality of stages, and wherein the diffuser case is configured to surround at least two stages of the second compressor.

5. The gas turbine engine according to claim 1 wherein the second end of the diffuser case is attached to a turbine case at a turbine attachment interface that is positioned aft of the internal flange connection, and wherein the at least one bleed is positioned adjacent the first end of the diffuser case.

6. The gas turbine engine according to claim 1 wherein the at least one bleed comprises an air supply boss configured to supply bleed air for cabin pressurization under a predetermined condition, and wherein the air supply boss defines an internal air passage that is in fluid communication with a high pressure compressor flow path.

7. The gas turbine engine according to claim 6 wherein the predetermined condition comprises a high altitude and low engine power condition.

8. The gas turbine engine according to claim 1 wherein the attachment interface defines a parting line between the compressor case and the diffuser case, and wherein the compressor section has a plurality of disks that include an aftmost disk that is defined by a disk center plane, and wherein the parting line is at or forward of the center plane of the aft-most disk.

9. The gas turbine engine according to claim 1 wherein the attachment interface defines a parting line between the compressor case and the diffuser case, and wherein the compressor section has a plurality of disks that includes a second-to-aftmost disk that is defined by a disk center plane, and wherein the parting line is at or forward of the center plane of the second-to-aftmost disk.

10. The gas turbine engine according to claim 1 wherein the attachment interface defines a parting line between the compressor case and the diffuser case, and wherein the compressor section has a plurality of disks that includes a third-to-aftmost disk that is defined by a disk center plane, and wherein the parting line is at or forward of the center plane of the third-to-aftmost disk.

11. A geared turbofan engine comprising:
a fan including a plurality of fan blades rotatable about an axis;
a core engine including a compressor section, a combustor in fluid communication with the compressor section, and a turbine section in fluid communication with the combustor;
a compressor case supporting the compressor section;
a diffuser case having a first end and a second end, the diffuser case being attached at an attachment interface at the first end to the compressor case, the attachment interface being between a forward and an aft end of the compressor section, and wherein the attachment interface comprises an external flange connection;
a support structure for an outer flowpath static structure that has an internal flange connection to the diffuser case that is positioned axially aft of the external flange connection; and at least one bleed formed in the diffuser case, wherein the bleed is positioned aft of the external flange connection and forward of the internal flange connection; and
a geared architecture driven by the turbine section for rotating the fan about the axis.

12. The geared turbofan engine according to claim 11 wherein the compressor section includes a first compressor operating at a first pressure and a second compressor operating at a second pressure that is higher than the first pressure, and wherein the first compressor defines the forward end and the second compressor defines the aft end of the compressor section.

13. The geared turbofan engine according to claim 12 wherein the second compressor comprises a plurality of stages, and wherein the diffuser case is configured to surround at least one stage of the second compressor.

14. The geared turbofan engine according to claim 11 wherein the second end of the diffuser case is attached to a turbine case at a turbine attachment interface that is positioned aft of the internal flange connection, and wherein the at least one bleed is positioned adjacent the first end of the diffuser case.

15. The geared turbofan engine according to claim 11 wherein the at least one bleed comprises an air supply boss configured to supply bleed air for cabin pressurization under a predetermined condition, and wherein the air supply boss defines an internal air passage that is in fluid communication with a high pressure compressor flow path.

16. The geared turbofan engine according to claim 15 wherein the predetermined condition comprises a high altitude and low engine power condition.

17. The geared turbofan engine according to claim 11 wherein the attachment interface defines a parting line between the compressor case and the diffuser case, and wherein the compressor section has a plurality of disks that includes an aftmost disk that is defined by a disk center plane, and wherein the parting line is at or forward of the center plane of the aft-most disk.

18. The geared turbofan engine according to claim 11 wherein the attachment interface defines a parting line between the compressor case and the diffuser case, and wherein the compressor section has a plurality of disks that includes a second-to-aftmost disk that is defined by a disk center plane, and wherein the parting line is at or forward of the center plane of the second-to-aftmost disk.

19. The geared turbofan engine according to claim 11 wherein the attachment interface defines a parting line between the compressor case and the diffuser case, and wherein the compressor section has a plurality of disks that includes a third-to-aftmost disk that is defined by a disk center plane, and wherein the parting line is at or forward of the center plane of the third-to-aftmost disk.

20. The geared turbofan engine according to claim 11 wherein the compressor case includes a compressor mount flange at an aft compressor case end and the diffuser case includes a diffuser mount flange at the first end of the diffuser case, and wherein the compressor and diffuser mount flanges are in direct abutting engagement with each other at a parting line and are secured together by at least one fastener to form the attachment interface, and wherein the parting line is axially forward of an aftmost stage of the compressor section.

21. The gas turbine engine according to claim 1 wherein the compressor case includes a compressor mount flange at an aft compressor case end and the diffuser case includes a diffuser mount flange at the first end of the diffuser case, and wherein the compressor and diffuser mount flanges are in direct abutting engagement with each other at a parting line and are secured together by at least one fastener to form the attachment interface, and wherein the parting line is axially forward of an aftmost stage of the compressor section.

* * * * *